(12) United States Patent
Sonnichsen

(10) Patent No.: US 9,188,329 B2
(45) Date of Patent: Nov. 17, 2015

(54) STEAM BOILER FOR A STEAM REFORMER

(75) Inventor: Brian Sonnichsen, Portland, OR (US)

(73) Assignee: Doosan Fuel Cell America, Inc., Atlanta, GA (US)

( * ) Notice: Subject to any disclaimer, the term of this patent is extended or adjusted under 35 U.S.C. 154(b) by 839 days.

(21) Appl. No.: 13/368,185

(22) Filed: Feb. 7, 2012

(65) Prior Publication Data

US 2013/0202977 A1    Aug. 8, 2013

(51) Int. Cl.
| | |
|---|---|
| *H01M 8/06* | (2006.01) |
| *F22B 1/16* | (2006.01) |
| *B01J 8/02* | (2006.01) |
| *F22B 21/26* | (2006.01) |

(52) U.S. Cl.
CPC ............... *F22B 1/167* (2013.01); *B01J 8/0257* (2013.01); *B01J 8/0285* (2013.01); *F22B 21/26* (2013.01); *H01M 8/0618* (2013.01); *B01J 2208/0053* (2013.01); *B01J 2208/00203* (2013.01); *B01J 2208/00212* (2013.01); *B01J 2208/00221* (2013.01); *B01J 2208/00477* (2013.01); *Y02E 60/50* (2013.01)

(58) Field of Classification Search
CPC ............. B01J 2208/00203; B01J 2208/00212; B01J 2208/00221; B01J 2208/00477; B01J 2208/0053; B01J 8/0257; B01J 8/0285; F22B 1/167; F22B 21/26; H01M 8/0618; Y02E 60/50
USPC .......... 429/408, 411, 416, 417, 419, 420, 423
See application file for complete search history.

(56) References Cited

U.S. PATENT DOCUMENTS

| | | | | |
|---|---|---|---|---|
| 5,497,824 A | * | 3/1996 | Rouf | 165/184 |
| 2010/0282448 A1 | * | 11/2010 | Singh et al. | 165/135 |

* cited by examiner

*Primary Examiner* — Patrick Ryan
*Assistant Examiner* — Ben Lewis
(74) *Attorney, Agent, or Firm* — Carlson, Gaskey & Olds

(57) ABSTRACT

Embodiments are disclosed that relate to a compact steam boiler which may provide steam to a steam reformer in a fuel cell system. For example, one disclosed embodiment provides a steam boiler including an outer shell and a first inner tube and a second inner tube within the outer shell, the first and second inner tubes spaced away from one another. The steam boiler further includes a twisted ribbon positioned inside each of the first and second inner tubes.

18 Claims, 5 Drawing Sheets

STEAM BOILER FOR A STEAM REFORMER

TECHNICAL FIELD

The present disclosure relates to the field of reforming, and more particularly, to a steam boiler for a methane steam reformer for generating hydrogen for use in a fuel cell.

BACKGROUND

In a steam reformer, under high temperatures (e.g., 400-800° C.) and in the presence of a catalyst (e.g., nickel), steam may react with a feed gas (e.g., methane) to generate a reformate (e.g., hydrogen) which may be used as fuel in a hydrogen fuel cell to generate electricity, for example. In some examples, the steam is generated in a steam boiler which is coupled to the reformer. As a size of the steam reformer is reduced due to packaging constraints, for example, a size of the steam boiler should also be reduced.

SUMMARY

Accordingly, various embodiments are disclosed herein related to a compact steam boiler for a steam reformer. For example, one disclosed embodiment provides a steam boiler comprising an outer shell and a first inner tube and a second inner tube within the outer shell, the first and second inner tubes spaced away from one another. The steam boiler further comprises a twisted ribbon positioned inside each of the first and second inner tubes.

In such an example, water may flow through the first and second inner tubes while oil flows through the outer shell. Due to the spacing between the first and second inner tubes, a surface area between the two fluids may be increased such that heat transfer to the water is increased, allowing steam to form over a shorter distance. Further, the twisted ribbon positioned inside each of the first and second inner tubes facilitates mixing of the water as it flows through the first and second inner tubes. In this manner, heat transfer may be further increased, thereby further reducing the distance over which steam is formed. As such, a more compact steam boiler may be formed for use with a steam reformer while efficiency of the steam boiler is maintained or increased.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

The following description relates to various embodiments of a steam reformer which includes a steam boiler which is configured to be compact and efficient. In one example embodiment, the steam boiler includes an outer shell and a first inner tube and a second inner tube within the outer shell, the first and second inner tubes spaced away from one another. For example, the first and second inner tubes may be spaced away from one another by thin wires wrapped around the tubes. The steam boiler further includes a twisted ribbon positioned inside each of the first and second inner tubes. In such a configuration, heat transfer may be increased due to an increased surface area between fluids flowing through the first and second tubes and the outer shell. Heat transfer may be further increased due to mixing facilitated by the twisted ribbon positioned inside each of the inner tubes. In this manner, steam may be formed in the steam boiler over a shorter distance such that the steam reformer is smaller while efficiency of the steam boiler is maintained. As will be described in greater detail below, the steam boiler may be coupled to an outside of a steam reformer such that the steam reformer may be supplied with steam for a reforming reaction.

Figure 1:
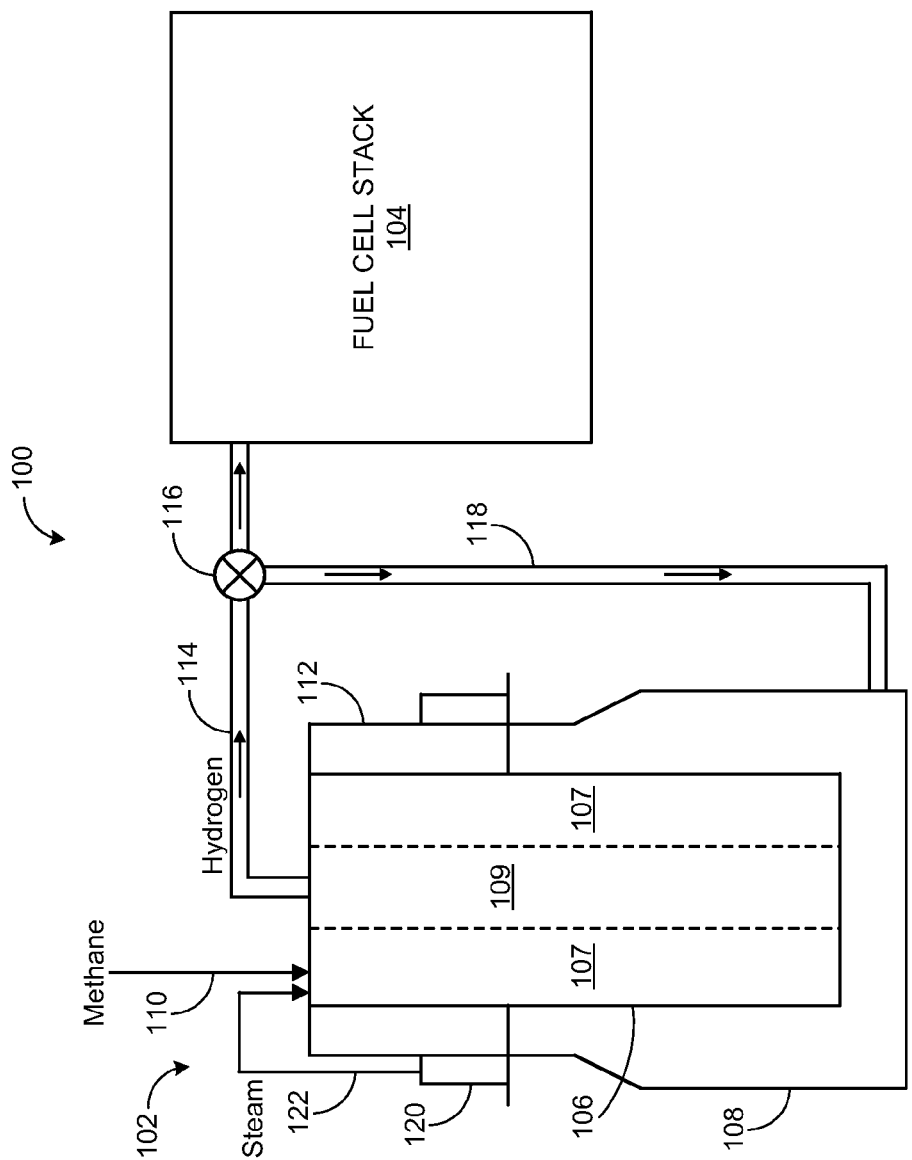
FIG. 1 shows a block diagram of a steam reforming system coupled to a fuel cell stack in accordance with an embodiment of the present disclosure.

FIG. 1 shows an example embodiment of a system 100 including a reformer 102 coupled to a fuel cell stack 104. The reformer 102 may generate a product stream (e.g., reformate) that contains hydrogen gas, for example. Hydrogen that is generated in the steam reformer 102 may be utilized, for example, by a fuel cell stack 104 to generate electrical power. The hydrogen may be further utilized to fuel a diffusion burner positioned within an exterior shell 108 which surrounds an interior reactor 106 of the reformer 102. The reformer 102 may be a steam reformer, for example, which converts a mixture of steam and a feed gas such as methane to hydrogen and carbon monoxide and/or carbon dioxide. In other embodiments, the reformer 102 may be an autothermal reformer or other reformer.

In the example embodiment of FIG. 1, the interior reactor 106 is supplied with a feed gas (e.g., methane or other suitable reactant) and at an inlet 110 and with steam at an inlet 122. The mixture of feed gas and steam may be produced in any suitable manner. For the purpose of describing operation of the reactor, the examples described herein will assume the feed gas is methane. It should be understood, however, any suitable feed gas may be used. In some embodiments, the methane/water mixture may be converted to a gaseous mixture by a vaporizer (not shown) before entering the interior reactor 106. In other embodiments, water may be heated so that it is in gaseous form before it is mixed with the methane.

The system 100 includes a steam boiler 120 positioned around an outside of the reformer 102. As will be described in greater detail below with reference to FIGS. 2-6, the steam boiler 120 may be configured as a shell-and-tube heat exchanger, such that it is compact and may be used with a steam reformer with increased packaging constraints.

In some embodiments, the interior reactor 106 may have a cylindrical shape and a reaction chamber 107 of the interior reactor may have a hollow shape, such as the depicted ring or annular shape, or other suitable shape that surrounds and conforms to the shape of the interior reactor. The reaction chamber 107 may be filled with a packing material such as a catalyst. For example, the packing material may be a metal-based catalyst such as nickel which facilitates the reaction of feed gas and steam within the reaction chamber 107. For example, in the presence of packing material and at high temperature (e.g., 750° C.), methane reacts with steam to form hydrogen and carbon monoxide via the following reversible reaction:

$$CH_4 + H_2O \leftrightarrow CO + 3H_2. \tag{1}$$

As will be described in more detail below with reference to FIG. 2, the exterior shell 108 includes a burner, such as a diffusion burner, for heating the reactor to a temperature for the reaction to occur. As shown in FIG. 1, the exterior shell 108 surrounds a portion of the interior reactor extending from a bottom end of the interior reactor 106 partially toward a top end of the interior reactor 106 (e.g., the end where feed gas enters the interior reactor). As a non-limiting example, the exterior shell 108 may cover 60% of the outer wall when the interior reactor rests inside the exterior shell. Exhaust from combustion that occurs within a cavity formed by the exterior shell may be used to heat the feed gas/water mixture before it enters the reaction chamber 107. In some embodiments, the reformer 102 may further include a recuperator 112 which surrounds a portion of the outer wall of the interior reactor 106 extending from a top portion of the exterior shell 108 toward the top end of the interior reactor 106. The recuperator 112 may be used to heat or maintain a high temperature in the upper part of reaction chamber 107 using exhaust gas from the diffusion burner or exhaust gas from the fuel cell stack 104 to which the interior reactor 106 supplies fuel, for example. It will be understood that heat may be provided to interior reactor 106 in any other suitable manner, and that the above-described embodiment is not intended to be limiting in any manner.

Reformate (e.g., hydrogen gas) generated in the reaction chamber 107 of the interior reactor 106 exits the reaction chamber at a bottom portion of the interior reactor and travels through an inner chamber 109 before exiting the interior reactor 106 at its top end. As shown in the example of FIG. 1, hydrogen is routed from the reformer to the fuel cell stack 104 via a first pipe 114. The first pipe 114 may have a diameter in accordance with, for example, a desired amount and/or pressure of hydrogen to be supplied to the fuel cell stack 104 based on a flow rate and pressure of hydrogen generated in the interior reactor 106. The first pipe 114 may be made of any suitable material for transporting hydrogen, such as stainless steel, for example. It will be understood that the term "pipe" signifies any suitable structure for carrying gases such as a tube, a hose, a manifold, or the like.

The fuel cell stack 104 may be configured to generate power from a reaction between the supplied fuel (e.g., hydrogen) and an oxidant for driving an external load. In some embodiments, the fuel cell stack 104 may include a plurality of fuel cells that may be electrically connected to generate a higher voltage. For example, the fuel cell stack 104 may include a plurality of fuel cells electrically connected in series.

The system 100 further includes a valve 116 for regulating a supply of a fuel to the fuel cell stack 104. The valve 116 may be controlled via a controller (not shown) to route a first portion of the hydrogen generated in the interior reactor 106 to the fuel cell stack 104. The valve 116 may be further controlled to route a second portion of hydrogen to the diffusion burner (not shown) positioned within the bottom portion of the exterior shell 108 via a second pipe 118. As one example, the valve 116 may be a three-way valve. The second pipe 118 may have similar characteristics (e.g., diameter, material, etc.) as the first pipe 114, for example. It will be understood that the depicted fuel delivery system (e.g., the first and second pipes 114 and 118 and the valve 116) is shown for the purpose of example, and that any other suitable component or components may be utilized to supply hydrogen to the diffusion burner and the fuel cell stack 104.

The system 100 may form a main or auxiliary electrical power supply, such as for a business or residential building. As such, packaging constraints may exist for the system and the system may have limited packaging space. A size of a system which includes the steam boiler, which will be described in greater detail below with reference to FIGS. 2-6, may be reduced such that efficiency of the system is maintained while also meeting packaging space constraints.

Figure 2:
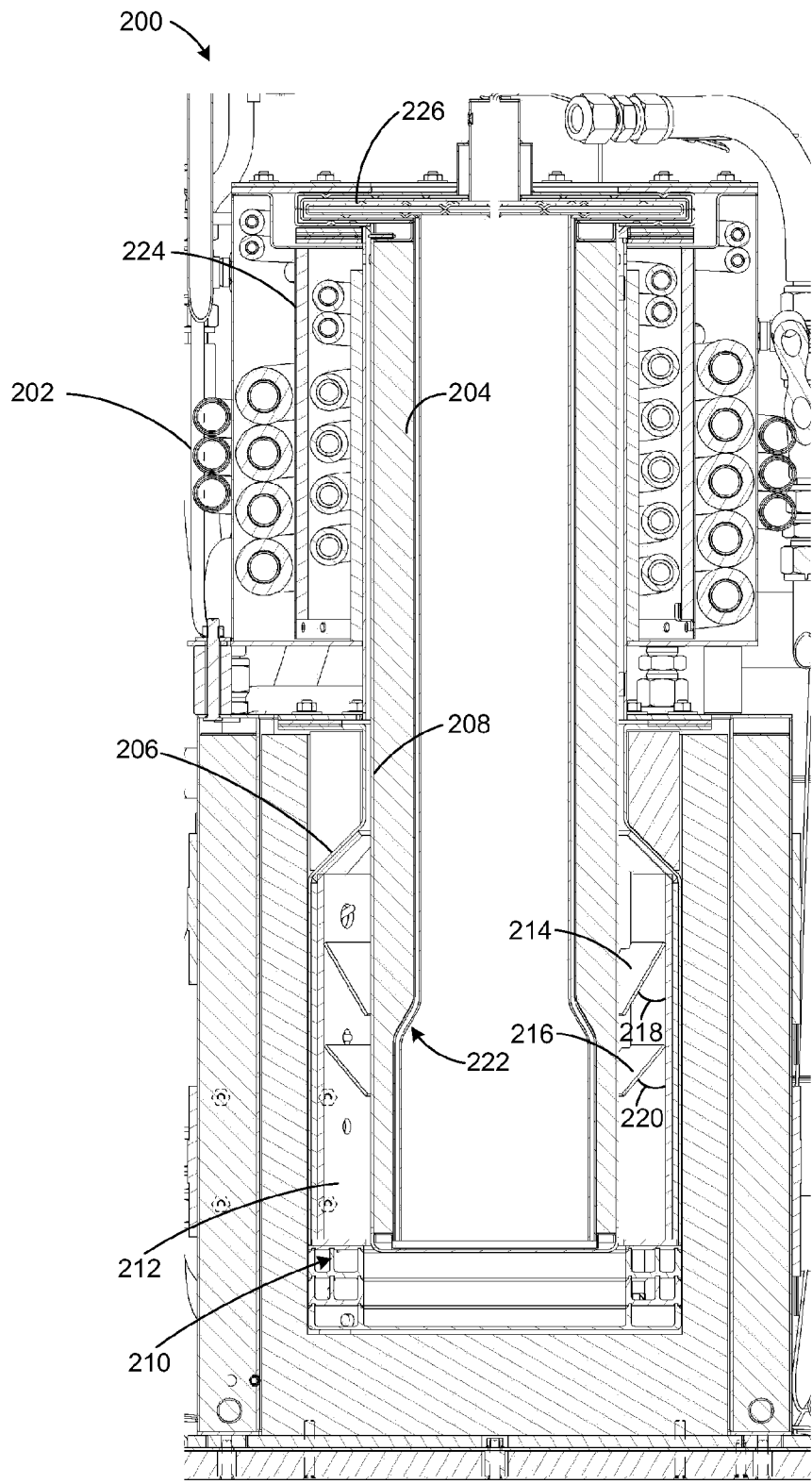
FIG. 2 shows a cross-sectional view taken along an axial direction of an example embodiment of a steam reformer with a steam boiler.

Continuing to FIG. 2, an example embodiment of a reformer 200 which includes a steam boiler 202 wrapped around an upper portion of a reaction chamber 204. The example shown in FIG. 2 is drawn to scale.

As depicted in FIG. 2, the reformer 200 includes an exterior shell 206 spaced from an outer wall 208 of the reaction chamber 204. The exterior shell 206 has a cylindrical shape with a tapered portion near a top end of the exterior shell resulting in a diameter at the top end less than that of a diameter at a bottom end of the exterior shell, similar to the shape of a milk can, for example. The exterior shell 206 may be formed of any suitable material that is capable of withstanding the high temperature of burning hydrogen and insulating the interior reactor. For example, the exterior shell may be made of high nickel content stainless steel alloy.

As shown in the example of FIG. 2, a diffusion burner 210 is positioned in a bottom portion of the exterior shell. Reformate (e.g., hydrogen) from the interior reactor may be fed to the diffusion burner 210 as fuel for the diffusion burner 210, as shown in FIG. 1. In some embodiments, hydrogen and air may be mixed within the diffusion burner 210 to form an oxygenated combustible fuel stream before being routed to a cavity 212 which is formed between the exterior shell 206 and the outer wall 208 of the reaction chamber 204, for example. In other embodiments, the fuel stream may be mixed before entering the burner.

The exterior shell 206 further includes two adjacent angled fins, first angled fin 214 (the upper fin) and second angled fin 216 (the lower fin) which are shaped to conform to the exterior shell. For example, the depicted fins are ring-shaped to conform to the shape of the depicted exterior shell. In other embodiments, the exterior shell may include one angled fin or more than two angled fins. Each angled fin may extend the same radial distance from the inner surface of the exterior shell, as shown in FIG. 2. For example, the angled fins 214 and 216 may extend to a radial distance that is 90% of a distance between the inner surface of the exterior shell and an outer surface of the outer wall 208 of the reaction chamber 204. In other examples, the angled fins may extend to different radial distances across the cavity 212. Furthermore, in the example of FIG. 2, an angle 218 between the angled fin 214 and the inner surface of the exterior shell is less than an angle 220 between the angled fin 216 and the inner surface of the exterior shell. As such, a length of the upper fin 214 is greater than a length of the lower fin 216. It should be understood that FIG. 2 is merely an example, and an exterior shell may include any suitable number of angled fins.

In some embodiments, the angled fins 214 and 216 may be made of solid or perforated metal or ceramic material. In such an embodiment, the angled fins behave as baffles to the flow of the combustion gases, as combustion gases heat extraction devices, and as directed thermal radiation emitters. For example, the angled fins receive energy from the combustion gases and from any other radiating surface in the burner cavity. The fins may be solid or may contain some perforations. The solid part of the fin behaves as a baffle to impede the flow of the combustion gases and introduce recirculation to the burner chamber thereby increasing convective heat transfer. When perforations are used, the perforations in the angled fins allow for combustion gases to pass through the fins and, as the combustion gases pass through the perforations, energy is transferred convectively to the fins. This energy may then be transferred via radiation to the interior reactor. Size, shape, and location of the perforations in each angled fin may be determined such that convective heat transfer to the fins from the combustion gases is increased while the cumulative radiation heat transfer through the perforations is decreased, for example. As such, each angled fin coupled to the exterior shell may have perforations with different characteristics (e.g., perforations are larger on the bottom fin than the top fin). As an example the perforations may be round holes ⅛ inch in diameter.

Furthermore, position, length and angle of the angled fins 214 and 216 may be determined such that a desired amount of heat is radiated to a desired location of the reaction chamber 204 in order to drive a reforming reaction in the interior reactor toward the formation of more products and based on a length of the reactor, for example. As an example, the angled fins may be located near a middle region of the exterior shell 206 which corresponds to a lower region of the reaction chamber 204 where more heat may be needed due to cooling of the reformate stream from the endothermic reforming reaction. As such, the interior reacted may be heated to a desired temperature at a desired location without extending the length of the reformer. Further, because more heat is transferred to an interior of the reformer, a temperature at the outer wall 208 of the reaction chamber 204 may be reduced, thereby reducing degradation of the reaction chamber walls due to high temperatures.

As shown in the example embodiment of FIG. 2, a step 222 is positioned at a height between a bottom of the upper angled fin 214 and a top of the lower angled fin 216. In some examples, a bottom of the step 222 may be positioned at a same height as a top of the lower angled fin 216 and a top of the step 222 may positioned at a same height as a bottom of the upper angled fin 214, for example. In such a configuration, the upper fin 214, which is positioned just above the step 222, may project heat into the reaction chamber 204 in the upper portion with the greater thickness above the step 222. The lower fin 216, which is positioned just below the step 222, may project heat into the lower portion of the reaction chamber 204 in the region where warmer and colder feed gases are mixing. In this manner, increased heating of the reaction chamber 204 may occur, thereby decreasing the time to drive to the reforming reaction to completion and reducing a distance needed for the reaction to be carried out completely for all of the feed gas.

The reformer 200 further includes an exhaust heat exchanger 224, or recuperator, surrounding an upper portion of the reaction chamber 204. The heat exchanger 224 may be used to heat or maintain a high temperature in the upper part of reaction chamber 204 using exhaust gas from the diffusion burner, for example. As shown in the example embodiment of FIG. 2, the steam boiler 202 is spirally wrapped around the heat exchanger 224 such that it forms a coil. In such a location, fluid connections (e.g., oil manifolds and water manifolds) for the steam boiler 202 may be easily integrated, for example. Further, in the location surrounding the heat exchanger 224, the steam boiler 202 may be well insulated, especially when the reformer is enclosed. In this manner, the efficiency of the steam boiler 202 may be increased by reducing heat loss, for example. As will be described in greater detail below with reference to FIGS. 3-6, the steam boiler 202 may include an outer shell, which houses oil, with two or more inner tubes, which house water, disposed within the outer shell.

As shown in FIG. 2, the reformer 200 further includes a circular plate-plate heat exchanger 226 disposed at a top of the reformer 200. The circular shape of the plates of the heat exchanger 226 creates a radial flow that causes the gasses flowing through the heat exchanger 226 to accelerate and decelerate depending on the flow direction. As such, a heat transfer rate across a common wall may be increased. For example, a change in direction as the gas flows move from flowing outward along the circular plates and then flowing inward creates turbulence which may increase heat exchange in such areas. Thus, the heat exchanger 226 allows for heat exchange between gasses entering and exiting the reaction chamber 204, such that a temperature of the feed gas may be increased before it enters the reaction chamber 204 and a temperature of reformate leaving the reaction chamber 204 may be reduced before it exits the reformer 200.

Thus, the reformer 200 may include a stepped reaction chamber 204 surrounded by the exterior shell 206 which includes adjacent angled fins 214 and 216. By positioning the fins at a location such that the height of the step 222 is aligned between the angled fins, heat may be radiated to locations above and below the step 222 in the reaction chamber 204 such that the reforming reaction occurs with a greater efficiency and over a shorter distance. Further, by including the circular plate-plate heat exchanger 226 at a top of the reformer 200, the temperature of the feed gas entering the reaction chamber 204 may be increased, further increasing the efficiency of the reformer 200. In such a configuration, by reducing the length of the reaction chamber, the overall size of the steam reformer may be reduced while maintaining system efficiency resulting in a more compact steam reforming system which meets packaging constraints for reformer/fuel cell systems.

As a size of the reformer system is reduced due to increased packaging constraints, it is desirable to have a steam boiler that is more compact without losing efficiency of the steam boiler. Thus, a steam boiler, such as the steam boiler 202 shown in FIG. 2 or a steam boiler 300 described in detail below with reference to FIGS. 3-6 may be used.

Figure 3:
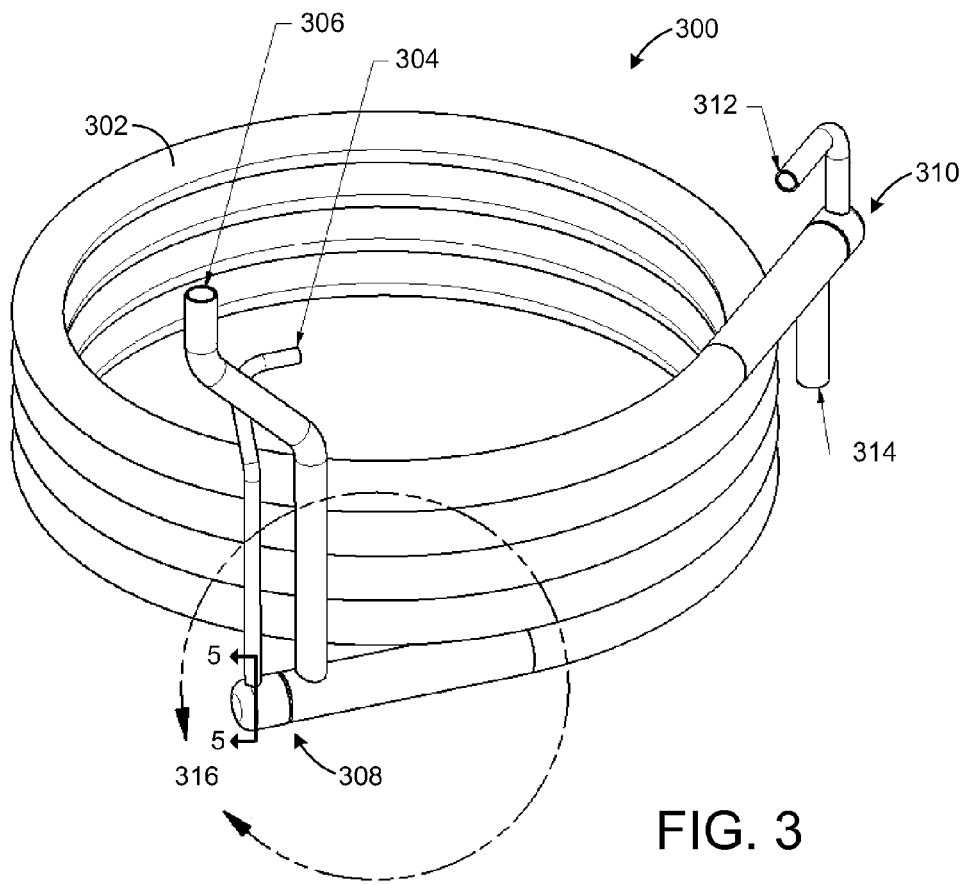
FIG. 3 shows a perspective view of a steam boiler in accordance with an embodiment of the present disclosure.

Continuing to FIG. 3, it shows a perspective view of an example embodiment of a steam boiler 300. As depicted, the steam boiler includes an outer shell 302 that is spirally wound and forms a coil. The steam boiler 300 may be included in a reformer system and wrapped around a component of the reformer, such as the exhaust heat exchanger, as described above with reference to FIGS. 1 and 2. In other examples, the steam boiler may be wrapped around another suitable component of the reformer. Because the steam boiler 300 may be wrapped around a cylindrical object (e.g., the reformer), the coiled steam boiler 300 has a substantially circular cross-sectional shape along a radial axis of the coil. In other embodiments, however, the steam boiler may be spirally wound around an object having another shape, such as an object that has an oblong cross-section, a hexagonal cross-section, or the like, and as such, the steam boiler may have a shape which conforms to the object.

As shown in FIG. 3, the steam boiler 300 includes a water inlet manifold 304 and an oil outlet manifold 306 at a first end 308 of the steam boiler 300. The water inlet manifold 304 supplies the steam boiler 300 with water from which steam is generated. As such, the water inlet manifold 304 may be coupled to a suitable water source (not shown), for example. The oil outlet manifold 306 carries cooled oil away from the steam boiler 300 after it has passed through the steam boiler 300.

A second end 310 of the steam boiler 300 includes a steam outlet manifold 312 and an oil inlet manifold 314. The steam outlet manifold 312 may be fluidly coupled to a steam inlet of the reformer, for example, via a pipe or other passage suitable for transporting steam from the steam boiler 300 to the reformer. The oil inlet manifold supplies the steam boiler 300 with a high temperature oil. The temperature of the oil may be high enough such that heat transfer between the oil and the water within the steam boiler 300 causes the water to boil and steam to form, for example. In one example, the heated oil may be supplied to the steam boiler 300 from a heated oil storage vessel (not shown) and cooled oil may be returned to the heated oil storage vessel via the oil outlet manifold 306. In other embodiments, a fluid other than oil may be used in the steam boiler to transfer heat to the water in order to generate steam. In the examples described herein, the oil and the water flow in opposite directions through the steam boiler 300.

Figure 4:
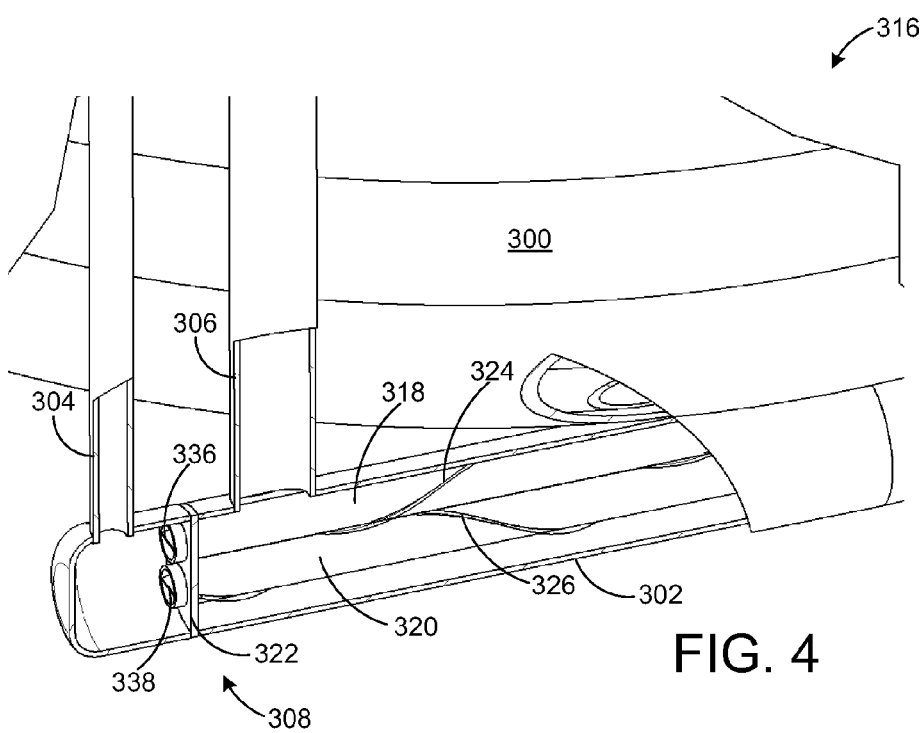
FIG. 4 shows an enlarged cross-sectional view of part of the steam boiler shown in FIG. 3.

FIG. 4 shows an enlarged cross-sectional view of a part of the steam boiler indicated at 316 in FIG. 3, which includes the first end 308 of the steam boiler 300. The cross-sectional view in FIG. 4 shows an interior of the steam boiler 300, as viewed from the side.

As depicted, the steam boiler 300 includes an outer shell 302. The steam boiler 300 further includes a first inner tube 318 and a second inner tube 320 positioned within the outer shell 302. The ends of the first and second inner tubes 318 and 320 pass through a divider 322, which is made of an impermeable material. The divider 322 may be sealed around the ends of the first and second inner tubes 318 and 320 and against an inner wall of the outer shell 302 such that fluids cannot flow around the divider 322. As shown, the water inlet manifold 304 is positioned on one side of the divider 322, closer to the end of the steam boiler, and the oil outlet manifold 306 is positioned on the other side of the divider 322. The second end 310 of the steam boiler 300 may include a similar divider (not shown) which is positioned within the steam boiler 300 between the oil inlet manifold 314 and the steam outlet manifold 312. In this manner, water may flow into the first end 308 of the steam boiler 300 from the water inlet manifold 304 and enter the only the first and second inner tubes 318 and 320, and steam may exit the steam boiler 300 without flowing outside of the first and second inner tubes 318 and 320. Meanwhile, oil may flow into the second end 310 of the steam boiler, through the outer shell 302, and out of the first end 308 of the steam boiler 300 without flowing into the first inner tube 318 or into the second inner tube 320. As such, there is no fluid communication between the fluids passing through the steam boiler, and the water and oil do not mix. In such a configuration, the steam boiler is a shell-and-tube exchanger, for example.

Further, as shown in FIG. 4, an exterior of the first inner tube 318 is wrapped with a first wire 324 in a first direction and an exterior of the second inner tube 320 is wrapped with a second wire 326 in a second direction. The first direction may be a clockwise direction around the first inner tube 318 and the second direction may be a counterclockwise direction around the second inner tube 320, for example. The first and second wires 324 and 326 may be relatively thin and made of a metal material, for example, that can withstand the relatively high temperature of the oil passing through the outer shell 302. It should be understood the first and second wires 324 and 326 may be made of any suitable material.

In the example depicted in FIG. 4, the first and second wires 324 and 326 are wrapped around the first and second inner tubes 318 and 320, respectively, such that the wires cross once per revolution along a length of the first and second inner tubes 318 and 320 (e.g., the wires are in contact with one another once per revolution). As such, the first and second inner tubes 318 and 320 are spaced away from one another by a distance approximately equal to the combined diameters of the first wire and the second wire 324 and 326. Further, in such a configuration, the first and second wires may contact one another at a plurality of cross-points along a length of the first and second inner tubes 318 and 320 to space the first inner tube's outer wall away from the second inner tube's outer wall by a thickness of approximately a sum diameters of the first and second wires. In this manner, the exterior surface area of the first and second inner tubes 318 and 324 that is in contact with the oil flowing through outer 302 may be maximized. As a result, heat transfer between the oil and the water may be increased. Further, the first and second wires 324 and 326 create turbulence in the oil flow, and cooled oil may continually be moved away from the exterior surfaces of the first and second inner tubes 318 and 320. As such, heat transfer between the water and oil in the steam boiler 300 may be further increased. Due to the increased heat transfer, steam may be generated more quickly and efficiently over a shorter distance, and thus, the steam boiler 300 may be made shorter and more compact.

Figure 5:
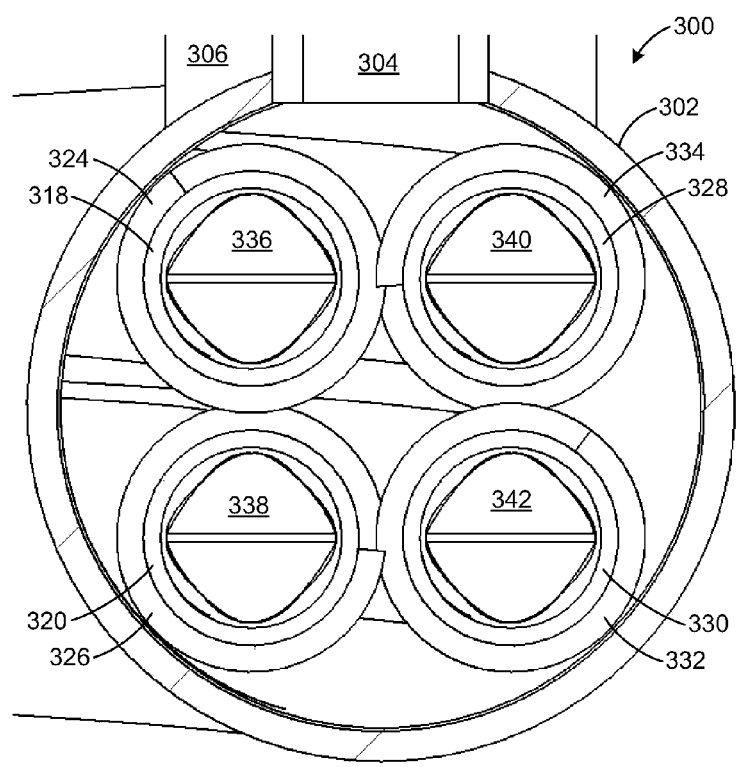
FIG. 5 shows a cross-sectional view taken along line 5-5 of FIG. 3.

FIG. 5 shows a cross-sectional view taken along a radial direction of the steam boiler 300 at the first end 308 of the steam boiler 300 (e.g., along line 5-5 shown in FIG. 3). As shown in FIG. 5, the steam boiler 300 includes four inner tubes positioned within the outer shell 302: the first and second inner tubes 318 and 320 described above with reference to FIG. 4, a third inner tube 328, and a fourth inner tube 330. Although the example embodiment shown in FIG. 4 shows four inner tubes, it should be understood the steam boiler may include any suitable number of inner tubes within the outer shell.

Similar to the first inner tube 318, the fourth inner tube 330 is wrapped with a fourth wire 332 in the first direction (e.g., clockwise). Similar to the second inner tube, the third inner tube 330 is wrapped with a third wire 334 in the second direction (e.g., counterclockwise). As with the first and second wires 324 and 326 described above, the first and third wires 324 and 334 cross once per revolution, the third and fourth wires 334 and 332 cross once per revolution, and the second and fourth wires 326 and 332 cross once per revolution. In this manner, like the first and second inner tubes 318 and 320 described above, the first and third inner tubes 318 and 328, the third and fourth inner tubes 328 and 330, and the second and fourth inner tubes 320 and 330 are spaced away from one another by a distance corresponding to the diameters of the wires wrapped around the inner tubes. As such, the surface area of each of the inner tubes in contact with the oil flowing through the outer shell 302 is maximized, thereby increasing heat transfer between the oil and the water flowing through the inner tubes. Further, due to the wires wrapped around each of the inner tubes, turbulence in the oil flow is increased such that cooled oil is continually moved away from the inner tubes, thereby further increasing heat transfer between the oil and water.

As depicted in FIG. 5, the outer shell 302 has a circular cross-section. In other embodiments, however, the outer shell may have another suitable cross-sectional shape, such as oblong, square, rectangular, hexagonal, or the like. Each of the four inner tubes also has a circular cross-section. It should be understood, however, like the outer shell, the inner tubes may have any suitable cross-sectional shape, such as oblong, square, rectangular, hexagonal, or the like. In some embodiments, each of the inner tubes may have a different shape, which may depend on a parameter such as the shape of the outer shell, for example. Further, the inner tubes are positioned within the outer shell such that they are spaced away from one another, as described above, and none of the inner tubes is interior to another (e.g., positioned inside another inner tube). In the embodiments described herein, the inner tubes are positioned such that they do not cross. In other embodiments, however, the inner tubes may be positioned within the outer shell such that they are twisted around one another, for example.

In the examples shown in FIGS. 4 and 5, the steam boiler 300 further includes a twisted ribbon is positioned inside each of the inner tubes. For example, a first twisted ribbon 336 is positioned within the first inner tube 318, a second twisted ribbon 338 is positioned within the second inner tube 326, a third twisted ribbon 340 is positioned within the third inner tube 328, and a fourth twisted ribbon 342 is positioned within the fourth inner tube 330. Each of the twisted ribbons may be made of a metal material, for example, that can withstand the temperatures inside the steam boiler 300. Further, a width of each of the twisted ribbons may be slightly less than a diameter of an inner wall of the inner tube in which the twisted ribbon is positioned.

Figure 6:
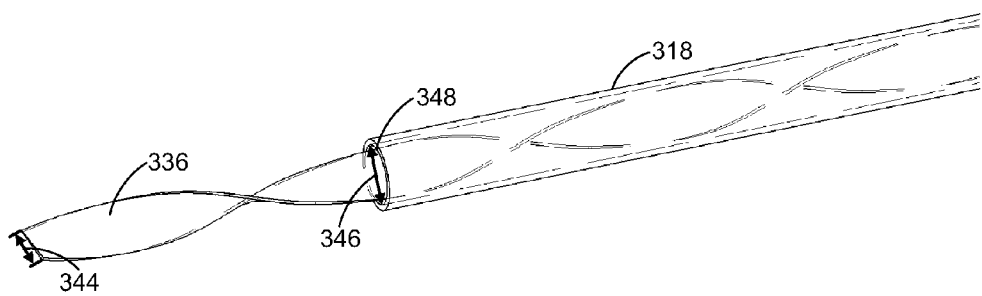
FIG. 6 shows a perspective view of an inner tube of a steam boiler in accordance with an embodiment of the present disclosure.

For example, FIG. 6 shows a perspective view of the first inner tube 318 and the first twisted ribbon 336. As depicted, a width 344 of the twisted ribbon 336 is slightly less than a diameter 346 of an inner wall 348 of the inner tube 318. In this manner, the twisted ribbon 336 may be inserted inside the inner tube 318 and a length of the twisted ribbon 336 may be substantially the same as a length of the inner tube 318. By positioning a twisted ribbon in each of the inner tubes, turbulence of the water flow through the inner tubes may be increased, thereby increasing heat transfer to the liquid water flowing through the inner tubes. Further, as the water boils in the inner tubes and water droplets are formed, the twisted ribbons act to force the water droplets toward the walls of the inner tubes where they contact the walls of the inner tubes. In this manner, the boiling effect may be enhanced, for example, and boiling may occur over a shorter length of inner tube such that a length of the steam boiler may be reduced.

Thus, the steam boiler may be spirally wrapped around an object, such as a heat exchanger of a reformer, and a shape of the steam boiler may conform to the shape of the object it is wrapped around. The steam boiler may include a plurality of inner tubes positioned within the outer shell of the steam boiler, each of the inner tubes wrapped with a wire such that they are spaced away from one another. In this way, the surface area of the inner tubes exposed to the oil flow through the outer shell may be maximized and the wires facilitate increased turbulence in the oil flow. As such, heat transfer between the oil and the water flowing though each of the inner tubes may be increased. Further, a twisted ribbon may be positioned within each of the inner tubes such that turbulence within the inner tube is increased, and heat transfer between the oil and water may be further increased. Therefore, due to the increased heat transfer, efficiency of the steam boiler may be increased and a length of the steam boiler may be decreased, such that the steam boiler may be made more compact.

Figure 7:
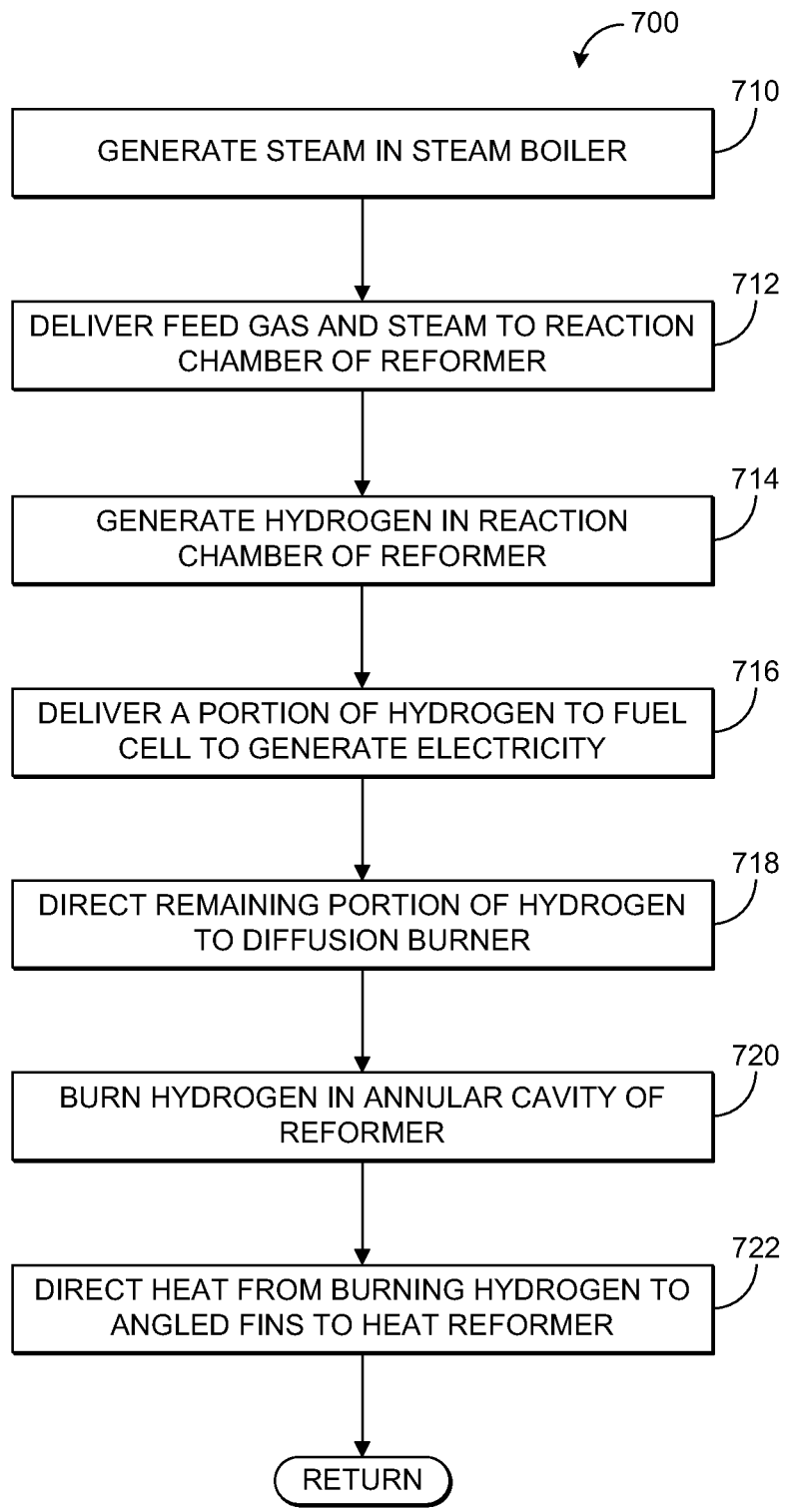
FIG. 7 shows a flow chart illustrating a method for a steam reformer coupled to a fuel cell stack in accordance with an embodiment of the present disclosure.

The flow chart in FIG. 7 illustrates an embodiment of a method 700 for a steam reformer coupled to a fuel cell stack, such as steam reformer 102 and fuel cell stack 104 shown in FIG. 1.

At 710 of method 700, steam is generated in the steam boiler. As described above, steam may be generated via heat exchange between heated water and oil flowing through the steam boiler.

At 712 of method 700, feed gas and steam are delivered to the interior reactor. As described above, the feed gas may be methane or another suitable reactant. Hydrogen is then generated at 714 of method 700 as the feed gas mixture travels through the interior reactor and is converted to hydrogen in the presence of a catalyst and high temperatures.

Once hydrogen is generated, a first portion of the hydrogen is delivered to the fuel cell stack to generate electricity at 716. For example, a first pipe routes the hydrogen to the fuel cell stack and the amount of hydrogen routed to the fuel cell stack may be optionally controlled via adjustment of a valve. A second portion of excess hydrogen is routed to an inlet of the diffusion burner at 718 of method 700. For example, the valve may be controlled to route the second portion of hydrogen to the diffusion burner via a second valve.

Hydrogen that is routed to the diffusion burner is then burned in the cavity formed by the exterior shell at 720 of method 700. Heat from the hydrogen flames is directed toward the angled fins to heat the reactor at 722 of method 700.

Thus, a compact steam boiler, such as described above with reference to FIGS. 3-6 may supply steam to a reformer. An external shell which includes one or more angled fins may be used to increase an amount of heat transferred to an interior reactor which it surrounds without extending the length of the reformer compared to an external shell that does not have angled fins. For example, the amount of heat transferred to the interior reactor may be at least partially controlled by a position, angle, and length of each angled fin coupled to an inner surface of the exterior shell. By controlling an amount of heat transferred to the interior reactor via the angled fins, a reforming reaction which occurs within the interior reactor may be driven toward the formation of more products.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A steam boiler, comprising:
   an outer shell;
   a first inner tube and a second inner tube within the outer shell, wherein the first inner tube is wrapped with a first wire in a first direction and the second inner tube is wrapped with a second wire in a second direction, and wherein the first and second inner tubes are spaced away from one another by the first and second wires; and a twisted ribbon positioned inside each of the first and second inner tubes.

2. The steam boiler of claim 1, wherein oil is housed in the outer shell and water is housed in the first and second inner tubes, and wherein the water does not communicate with the oil.

3. The steam boiler of claim 1, wherein the first wire and the second wire cross once per revolution along a length of the first and second inner tubes.

4. The steam boiler of claim 1, wherein the ribbon is made of a metal material and has a width that is less than a diameter of the inner tube in which it is positioned.

5. The steam boiler of claim 1, wherein the first and second inner tubes are circular in cross-section.

6. The steam boiler of claim 1, further comprising a water inlet manifold at a first end of the steam boiler which provides water to the first and second inner tubes and an oil inlet manifold at a second end of the steam boiler which provides heated oil to the outer shell.

7. The steam boiler of claim 6, wherein the water inlet manifold and the oil inlet manifold are configured to allow the water and heated oil to flow through the steam boiler in opposite directions.

8. The steam boiler of claim 1, wherein the outer shell is circular in cross-section, and wherein the outer shell is spirally wrapped around a recuperator of a steam reformer.

9. The steam boiler of claim 1, wherein the outer shell has a circular cross-section and the first and second inner tubes have circular cross-sections.

10. A steam boiler, comprising:

an outer shell that is circular in cross-section, wherein the outer shell is spirally wrapped around a recuperator of a steam reformer;

a first inner tube and a second inner tube within the outer shell, the first and second inner tubes being spaced away from one another; and a twisted ribbon positioned inside each of the first and second inner tubes.

11. The steam boiler of claim 10, wherein oil is housed in the outer shell and water is housed in the first and second inner tubes, and wherein the water does not communicate with the oil.

12. The steam boiler of claim 10, wherein the first inner tube is wrapped with a first wire in a first direction and the second inner tube is wrapped with a second wire in a second direction, and wherein the first and second inner tubes are spaced away from one another via the first and second wires.

13. The steam boiler of claim 12, wherein the first wire and the second wire cross once per revolution along a length of the first and second inner tubes.

14. The steam boiler of claim 10, wherein the ribbon is made of a metal material and has a width that is less than a diameter of the inner tube in which it is positioned.

15. The steam boiler of claim 10, wherein the first and second inner tubes are circular in cross-section.

16. The steam boiler of claim 10, further comprising a water inlet manifold at a first end of the steam boiler which provides water to the first and second inner tubes and an oil inlet manifold at a second end of the steam boiler which provides heated oil to the outer shell.

17. The steam boiler of claim 16, wherein the water inlet manifold and the oil inlet manifold are configured to allow the water and heated oil to flow through the steam boiler in opposite directions.

18. The steam boiler of claim 10, wherein the outer shell has a circular cross-section and the first and second inner tubes have circular cross-sections.

* * * * *